United States Patent [19]

Schepers

[11] 4,424,309

[45] Jan. 3, 1984

[54] POLYMER COMPOSITION COMPRISING CLPE, S/AN, PVC, AND RUBBER

[75] Inventor: Herman A. J. Schepers, Stein, Netherlands

[73] Assignee: Stamicarbon B.V., Geleen, Netherlands

[21] Appl. No.: 291,077

[22] Filed: Aug. 7, 1981

[30] Foreign Application Priority Data

Aug. 8, 1980 [NL] Netherlands .................. 8004522

[51] Int. Cl.³ .................. C08L 23/28; C08L 23/16; C08L 23/22; C08L 27/06
[52] U.S. Cl. .................. 525/211; 525/192; 525/213; 525/230; 525/233; 525/238
[58] Field of Search ............ 525/211, 213, 192, 230, 525/233, 238

[56] References Cited

U.S. PATENT DOCUMENTS

| | | | |
|---|---|---|---|
| 3,658,950 | 4/1972 | Troy | 260/897 C |
| 3,819,763 | 6/1974 | Akane et al. | 525/238 |
| 4,341,884 | 7/1982 | Schepers | 525/211 |
| 4,341,885 | 7/1982 | Schepers | 525/211 |

FOREIGN PATENT DOCUMENTS 1400929 7/1975 United Kingdom .

OTHER PUBLICATIONS

Chem. Abstracts, vol. 81, 1974, p. 93-154021s (JA-A-7344933), Showa Denko.

*Primary Examiner*—Carman J. Seccuro

[57] ABSTRACT

The invention relates to a polymer composition based on a copolymer of an unsaturated nitrile, a substantially saturated rubber, a chlorinated polyethylene, and a vinylchloride polymer.

To improve the impact resistance and the flexural modulus, the polymer composition according to the invention comprises:

a. 50-95 parts by weight of:
  a.1. 5-70 parts by weight of one or more polymers obtained by polymerizing a mixture of:
    10-90% wt. styrene and/or styrene derivatives,
    90-10% wt. acrylonitrile and/or methacrylonitrile, and
    0-20% wt. of one or more other monomers; and
  a.2. 95-30% vinylchloride polymer; and
b. 5-50 parts by weight of:
  b.1. a substantially saturated rubber, and
  b.2. chlorinated polyethylene;

with the vinylchloride polymer content in the overall polymer composition being at least about 25% by weight.

10 Claims, No Drawings

POLYMER COMPOSITION COMPRISING CLPE, S/AN, PVC, AND RUBBER

This invention relates to an impact-resistant compounded polymer composition based on a copolymer of an unsaturated nitrile, a substantially saturated rubber, a chlorinated polyethylene, and a vinyl chloride polymer.

In general, an impact-resistant polymer composition based on an unsaturated nitrile contains a graft polymer consisting of a rubber with, grafted thereon, one or more monomers. Such monomers may be styrene, α-methylstyrene, acrylonitrile, vinylchloride, maleic anhydride and/or one or more acrylates. A typical example of such polymer compositions is ABS (a copolymer of styrene and acrylonitrile grafted onto a (butadiene) rubber). Due to the fact that a part of the monomers forming the continuous phase (or matrix) of the polymer composition is grafted onto the rubber, these compositions generally possess high impact resistance, even at low temperatures ($-20°$ C.).

For the rubber, a polybutadiene or a related rubber composition is used in most cases. These rubbers are substantially unsaturated in their main chain, which makes them sensitive to oxidation when exposed to light and/or molecular oxygen. As a result of the ensuing severe deterioration of the physical and mechanical properties of objects made from such polymer compositions, they are not suitable for outdoor applications without special protection.

To solve this problem, it has been proposed to replace the rubber in the polymer compositions with a substantially saturated rubber, for instance an ethylene-propylene or an ethylene-propylenediene rubber. In this connection, reference may be made, for instance, to the U.S. Pat. No. 3,886,233 and published U.K. patent application No. 2,005,276-A, the disclosures of which are incorporated herein by reference.

By this means, a polymer composition can be obtained which combines good impact resistance with good UV stability.

However, a disadvantage of these graft copolymers is their rather poor flow behavior, which keeps the processing speed low, and which may also lead to problems in filling the mold, especially where intricate objects are to be produced. In comparison with polymer mixtures, these graft copolymers also require the use of a rather involved production process.

According to the German Offenlegungsschrift No. 2235052 the disclosure of which is incorporated herein by reference, it is possible to increase the impact-resistance of polymer compositions based on a copolymers of styrene and acrylonitrile, a substantially saturated rubber and a chlorinated polyethylene, by adding thereto a small amount of polyvinylchloride (i.e., about 3%). According to this Offenlegungsschrift, the impact-resistance is thereby improved. In an absolute sense, however, the impact resistance still remains low, and it has been found that the rigidity flexural modulus of these compositions is very low.

The object of the present invention is to provide a compounded polymer composition based on a copolymer of an unsaturated nitrile, a substantially saturated rubber, a chlorinated polyethylene and a vinylchloride polymer which combines good impact-resistance with a high flexural modulus.

The present invention is distinguished by the characteristics that the compounded polymer composition comprises:
a. 50–95 parts by weight of
  a.1. 5–70% wt. of one or more polymers obtained by polymerizing a mixture of:
    10–90% wt. styrene and/or styrene derivatives, and
    90–10% wt. acrylonitrile and/or methacrylonitrile, and
  a.2. 95–30% wt. vinylchloride polymer, and
b. 5–50 parts by weight of:
  b.1. a substantially saturated rubber, and
  b.2. chlorinated polyethylene; and wherein the vinylchloride polymer content in the overall polymer composition is not less than 25% by weight.

Surprisingly, it has now been found that such a polymer composition has a high impact-resistance. The impact-resistance of the polymer composition is even comparable to that of a high-impact ABS. And, even at low temperatures the impact-resistance still remains considerable.

Further, the polymer composition according to this invention has unexpectedly high rigidity (flexural modulus). This was unexpected because, in general, rigidity decreases as the impact-resistance becomes higher.

An additional advantage offered by the polymer composition according to this invention is that the proportions of the respective constituents, viz., rubber, chlorinated polyethylene, copolymer of unsaturated nitrile, and vinylchloride polymer, can be varied within wide limits. This means that there is extended freedom in making polymer compositions having a wide gamut of properties, such as rigidity, heat distortion temperature (Vicat, HDT), impact strength, flame retardant characteristics, gloss, inmold shrinkage, flow and deformability, of the resultant mixtures, without it being necessary to modify the preparation of any of the components, whereas this has to be done for the preparation of the known products based on graft copolymers.

It is highly surprising that the compounded polymer composition according to the present invention should combine the properties of good impact resistance along with high rigidity.

It is a known fact, which is, indeed, confirmed by the Examples, that mixtures of a styrene-acrylonitrile (SAN) polymer with polyvinylchloride (PVC) have low impact resistance. Equally so, mixtures of SAN and PVC with chlorinated polyethylene or a rubber also have little impact resistance. Moreover, in view of the total amount of PVC, rubber and chlorinated polyethylene used herein, the rigidity would be expected to be unacceptably low.

However, it has now been found that both the impact resistance and the rigidity of the polymer composition according to the invention remain at a good level. Depending on the values desired, it is possible by varying the mixing ratios to adapt the ratio between impact resistance and rigidity to the specific requirements of a given case.

Advantageously, it is preferred that the quantity of rubber and chlorinated polyethylene together is at least 10% by wt., as related to the total polymer composition. Although smaller amounts may well be used, especially if a combination of high rigidity with comparatively low impact resistance is desired in the product, the above preferred composition generally has the optimum ratio between rigidity and impact resistance.

In view of the minimum rigidity which is generally desired, preference is advantageously given to a polymer composition containing not more than 40% by wt., in particular not more than 25% by wt., of rubber and chlorinated polyethylene. The best value for the combined amount of chlorinated polyethylene and rubber together will also depend somewhat on the type of chlorinated polyethylene used.

To obtain good impact resistance, it is necessary that the polymer composition contains a minimum amount of the vinylchloride polymer. The upper limit for the quantity of vinylchloride polymer, and the ratio between vinylchloride polymer and unsaturated nitrile copolymer, are mainly determined by the desired requirements for impact resistance, heat resistance and flame retarding characteristics.

An important point is that a larger proportion of unsaturated nitrile copolymer leads to better heat resistance, but has an unfavorable effect on the impact resistance and the flame retarding characteristics. However, the effect of the use of a higher content of vinylchloride polymer is just the opposite. In addition, this latter component will cause a decrease in rigidity (for equal proportions of rubber and chlorinated polyethylene).

By preference, the compounded polymer composition of this invention advantageously conforms to the criteria that a.1. 10-65% wt. of a copolymer of acrylonitrile and styrene and/or α-methylstyrene,
a.2. 25-80% wt. polyvinylchloride,
b.1. 5-20% wt. rubber,
b.2. 5-20% wt. chlorinated polyethylene,
c. 0-10% wt. additives.

Suitable for use as the rubber-like, largely saturated polymer component are those rubbers containing none or very few unsaturated sites in their main chain, i.e., rubbers containing fewer than 2, by preference fewer than 1.5, double bonds per 100 carbon atoms. Such rubbers may, however, have side chain unsaturation which may be utilized, for instance, for cross-linking.

Rubbers which are particularly suited, for application in the process according to the invention are ethylene-propylene copolymers (so-called EP rubbers), and ethylene-propylene copolymers formulated with other copolymerized poly-unsaturated comonomers (so-called EPT rubbers), as well as butyl rubber (i.e., a polymer based on isobutylene), chlorobutyl rubber, acrylate rubber, and ethylenevinylacetate copolymers of high vinylacetate content, or mixtures of two or more of these rubbers.

Examples of the just-mentioned copolymerizable poly-unsaturated comonomers include hexadiene-1,4,dicyclopentadiene, tricyclopentadiene, 5-vinylnorbornene-2, 5-ethylidene-norbornene-2, 5-ethylidenenorbornene-2, 5-methylenenorbornene-2, 5-(2-propenyl)-norbornene-2, 5-(5-hexenyl)norbornene-2, 4,7,8,9-tetrahydroindene, and isopropylidenetetrahydroindene.

It is not essential for the polymer composition to be vulcanized; accordingly, it is not necessary to use said poly-unsaturated comonomers. Hence, it may be economically advantageous to use ethylene-propylene rubber per se in the polymer composition in particular embodiments.

In certain cases, it may also be advantageous to cross-link all or part of the rubber. This can be done in the usual fashion, already known, for instance, by means of peroxides. Also, use may be made of chemically modified rubber.

The chlorinated polyethylenes, or mixtures of two or more chlorinated polyethylenes, which are suitable for use in the polymer compositions according to this invention can be prepared in already known ways, e.g., by chlorinating polyethylene in solution, in suspension, or in the gas phase. In this connection, reference is made to the U.S. Pat. Nos. 3,935,181 and 4,197,386, the disclosures of which are incorporated herein by reference. By preference, the starting material used is a highdensity polyethylene, i.e., a polyethylene having a density of between 935 and 965 kg/m$^3$, and which may have been prepared by means of a catalyst based on transition metals.

A preferred way of realizing the invention, is to make use of a chlorinated polyethylene having a chlorine content of between 15 and 50 wt.%, or more in particular between 15 and 30 wt.%.

Further, the chlorinated polyethylene preferably has a crystallinity value (measured by the Differential Scanning Calorimeter-DSC) which is upwards of 10%, or more in particular between 15 and 40% (2nd heating curve).

The weight ratio between the chlorinated polyethylene and the rubber is preferably between 1:20 and 20:1. Polymer compositions in which the ratio is between these limits have particularly good impact resistance, even also at low temperature (e.g., −20° C.).

Optimum properties appear to be especially obtained when the weight ratio of chlorinated polyethylene and substantially saturated rubber is between 1:4 and 4:1.

Another advantageous way of realizing the invention, is to make use of a chlorinated polyethylene having a chlorine content of 30-40 wt.% and a DSC crystallinity of 0-7%, while maintaining the weight ratio of rubber to chlorinated polyethylene in the polymer composition being between 2:1 and 1:10.

The crystallinity is determined in a Differential Scanning Calorimeter by first heating a sample at +150° C. for 5 minutes, next cooling it down to +50° C. at the rate of 5° C. per minute, and then heating it up again to +150° C. at the same rate of 5° C. a minute. During this latter heating-up phase, the melting heat is measured. The crystallinity is then determined by means of the following formula:

$$\text{crystallinity (\%)} = \frac{\text{melting heat measured (J/g)} \times 100\%}{\text{theoretical melting heat of 100\% crystalline polyethylene (J/g)}}$$

The glass transition temperature of the chlorinated polyethylene should be at least equal to −15° C. or higher. The upper limit is not critical. In practice, the upper limit of the glass transition temperature for the chlorinated polyethylene will be dictated by the requirements that are to be satisfied with respect to crystallinity and chlorine content. This limit is generally at about +10° C.

The term glass transition temperature as used herein denotes the temperature at which the maximum in the damping (G″, loss modulus) is obtained which is characteristic of the type of chlorinated polyethylene, measured by means of a torsiondamping meter at a frequency of 0.2153 Hz and a heating rate of 1° C. per minute.

It should be observed in this connection that usually the chlorinated polyethylene has two transition temperatures. In general, one is around about −120° C., and the other transition temperature has a higher value and varies according to the manner in which the chlorinated polyethylene has been prepared. In general, it is this latter transition temperature to which reference is made in literature when the glass transition temperature of chlorinated polyethylene is mentioned. Therefore, it is also this latter temperature which is listed as the glass temperature of chlorinated polyethylene in the present specification.

If the choice of a chlorinated polyethylene with a specific combination of chlorine content, DSC crystallinity and, optionally, glass transition temperature is made according to the preferred modes of realization of the process according to this invention, this results in the further advantage of an additional improvement to the impact resistance while still retaining high rigidity. It is therefore important in this case that the chlorination conditions be so chosen that a comparatively high proportion of the resultant polyethylene is crystalline. This can be particularly achieved by carrying out the chlorination at comparatively low temperatures. In this manner, a specific distribution of chlorine atoms over the polymer molecule is obtained, which manifests itself in a relatively high glass transition temperature.

The preparation of the unsaturated nitrile copolymer can be done by either a continuous or a batch process, suitably with the use of known polymerization techniques, such as emulsion, suspension, solution and bulk polymerization, or by methods combining such techniques.

As such copolymer any of the various copolymers of acrylonitrile or derivatives thereof with vinylaromatic compounds may be employed.

In principle, use is made of a copolymer of acrylonitrile with styrene and/or α-methylstyrene. This copolymer may additionally contain a minor quantity of one or more other comonomers.

Examples of such copolymers which are useful include styrene-acrylonitrile copolymer, α-methylstyrene-acrylonitrile copolymer, styrene- or α-methylstyrene-acrylonitrile-maleic anhydride terpolymer, and styrene-α-methylstyrene-acrylonitrile terpolymer, as well as copolymers of acrylonitrile with halogenated styrene, or mixtures of two or more of these polymers.

The vinylchloride polymer used is advantageously polyvinylchloride. In certain applications, it may be advantageous to use copolymers of vinylchloride which contain up to 30 mol.% of one or more comonomers copolymerizable with vinylchloride. Comonomers copolymerable with vinylchloride include alkenes with from 2 to 12 carbon atoms, e.g., ethylene, propylene, butylene, isobutylene, dodecene, etc., as well as dienes such as butadiene or isoprene. Vinylchloride may also be copolymerized with vinyl esters and allyl esters, such as vinylacetate, vinylchloroacetate, vinylpropionate, vinylbutyrate, allylacetate, etc., or with vinylaromatic compounds, e.g., styrene, α-methylstyrene, chlorostyrene, vinyltoluene, or with other monomers copolymerizable with vinylchloride, such as vinylidene-chloride, maleic esters, etc. Vinylchloride may also be graft-polymerized to a polymer base, such polymer base being, for instance, ethylene-propylene copolymers or terpolymers, ethylene-vinylacetate copolymers, etc. It may also be advantageous to use as, the vinylchloride polymer, chlorinated polymers or copolymers of vinylchloride, especially if the polymer composition is to have improved heat resistance.

The polymer composition according to this invention can be prepared from the various named starting mterials, by the usual compounding methods. Depending on the form in which the starting materials are available (powder, crumb, liquid) various devices or combinations of devices may be used, such as a high-speed mixer, a Banbury mixer, a kneader-extruder, and such like.

Impact-resistant polymer compositions are generally marketed by producers in the form of granulates, consequently the polymer compositions hereof will, in general, also be granulated by means of an extruder, after the starting materials have been mixed. The mixing also may be effected, at least in part, in this extruder.

The usual additives may be supplied to the polymer compositions, such as anti-oxidants, antistatic agents, release agents, fillers, colorants, pigments, UV stabilizers, fungicides, etc. The additive amount should be at most about 10% of the total weight of the compounded composition.

The compounded polymer composition according to the invention is particularly suitable for making objects that have to satisfy high requirements as regards mechanical and physical properties, such as impact resistance, rigidity, etc., especially if these properties have to be combined with good UV resistance.

Thus, the polymer compositions of this invention are suitable for many user applications. Many kinds of impact-resistant objects can be made, such as bottles, tubes, furniture pieces, motorcar dashboards, casings for electronic and domestic equipment, shoe heels, caravans, skis and surfboards. This invention also relates to such objects made in whole or in part from the polymer composition described above.

An additional advantage of the polymer composition according to this invention is that the composition of itself, has good flame extinction. Depending on the specific proportions of the various components therein, the composition may satisfy the requirements of Classes V-1 or V-0 according to test UL-94. Optionally, the fire behaviour can be further improved by adding flame-extinguishing additives, such as metal oxides (antimony trioxide, zinc oxide, titanium oxide, zinc titanate).

This invention will now be elucidated by means of the following non-limiting Examples, and Comparative Examples.

In all Examples given below, use was made of a copolymer of styrene and acrylonitrile (SAN) with a nitrogen content of 6.9% wt. and a viscosity value of 0.64 dl/g (0.1 g in 100 ml acetone at +20° C.).

The rubber used was an ethylene-propylenediene rubber having an ethylene content of 74% wt. and a diene content (ethylidene-norbornene) of 1.85% wt. The Hoekstra plasticity of the rubber was 53.

The vinylchloride polymer was polyvinylchloride (PVC) with a K value (according to Fikentscher) of about 70.

The chlorinated polyethylenes (CPE) employed have the several characteristics shown in Table 1, below.

These materials are used because they are illustrative of the advantages of this invention, and also to permit ready comparison of results, but it will be understood the invention is not limited thereto, as described above.

TABLE 1

| CPE | Chlorine Content % wt. | Crystallinity % | Glass Transition Temperature °C. |
|---|---|---|---|
| A | 25.7 | 20 | +7 |
| B | 26.8 | 28 | 0 |
| C | 34.5 | 4 | −15 |
| D | 24.4 | 10 | −21.5 |

EXAMPLE I AND COMPARATIVE EXAMPLES A. THROUGH D.

Starting from a mixture of 50 parts of PVC and 50 parts of SAN, a number of compositions were prepared with the incorporation of chlorinated polyethylene and/or rubber.

The impact resistance and rigidity of these compositions and of the PVC/SAN mixture itself were determined. The results are shown in Table 2.

TABLE 2

| Example | SAN parts wt. | PVC parts wt. | Rubber parts wt. | CPE type | CPE Parts wt. | Impact res.* kJ/m² | Rigidity** N/mm² |
|---|---|---|---|---|---|---|---|
| a. | 50 | 50 | — | — | — | 2.0 | 3360 |
| b. | 42.5 | 42.5 | — | A | 15 | 2.8 | 2560 |
| c. | 42.5 | 42.5 | — | C | 15 | 3.9 | 2520 |
| d. | 42.5 | 42.5 | 15 | — | — | 2.7 | 2220 |
| I. | 42.5 | 42.5 | 7.5 | A | 7.5 | 47.7 | 2370 |

*ASTM D 256; temperature 23° C.
**ASTM D 790 (flexural modulus)

These Examples clearly show that none of the SAN/PVC (a.), the SAN/PVC/rubber (d.) and the SAN/PVC/CPE (b.) and (c.) mixtures possess a reasonable impact-resistance value. By contrast, the inventive mixture composed of all four components, Example I, does have an exceptionally good impact resistance which is also combined with high rigidity.

EXAMPLES II THROUGH V AND COMPARATIVE EXAMPLES E., F., and G.

A number of polymer compositions were prepared with variations in the SAN/PVC ratios, at constant rubber and chlorinated polyethylene contents.

TABLE 3

| Example | SAN parts wt. | PVC parts wt. | Rubber parts wt. | CPE type | CPE Parts wt. | Impact res.* kJ/m² | Rigidity** N/mm² |
|---|---|---|---|---|---|---|---|
| e. | 85 | — | 7.5 | A | 7.5 | 2.3 | 2630 |
| f. | 63.75 | 21.25 | 7.5 | A | 7.5 | 13.0 | 2510 |
| II | 56.7 | 28.3 | 7.5 | A | 7.5 | 31.2 | 2490 |
| III | 42.5 | 42.5 | 7.5 | A | 7.5 | 47.7 | 2370 |
| IV | 28.3 | 56.7 | 7.5 | A | 7.5 | 72.2 | 2340 |
| V | 21.25 | 63.75 | 7.5 | A | 7.5 | 80.5 | 2190 |
| g. | — | 85 | 7.5 | A | 7.5 | 80.6 | 1870 |

For * and **, see Table 2.

Again, the Examples II, III, IV and V of the present invention display a retained acceptably high rigidity combined with very good impact resistance. Note that Comparative Example g., lacking SAN, has an undesired, significantly lower rigidity.

EXAMPLES VI THROUGH XII

The following Examples illustrate how at constant SAN/PVC ratio and a constant rubber/CPE ratio the properties of the polymer composition are affected by variations in the absolute quantities of rubber and CPE.

TABLE 4

| Example | SAN parts wt. | PVC parts wt. | Rubber parts wt. | CPE type | CPE Parts wt. | Impact res.* kJ/m² | Rigidity** N/mm² |
|---|---|---|---|---|---|---|---|
| VI | 45 | 45 | 5 | A | 5 | 5.0 | 2740 |
| VII | 43.5 | 43.5 | 6.5 | A | 6.5 | 19.9 | 2490 |
| VIII | 42.5 | 42.5 | 7.5 | A | 7.5 | 47.7 | 2370 |
| IX | 37.5 | 37.5 | 12.5 | A | 12.5 | 65.0 | 1730 |
| X | 40.0 | 40.0 | 6 | C | 14 | 28.8 | 2210 |
| XI | 37.55 | 37.5 | 7.5 | C | 17.5 | 70.5 | 1890 |
| XII | 35.0 | 35.0 | 9 | C | 21 | 82.0 | 1490 |

For * and **, see Table 2.

EXAMPLES XIII THROUGH XV

These Examples show the influence of the type of the chlorinated polyethylene on the properties of the polymer composition.

TABLE 5

| Example | SAN parts wt. | PVC parts wt. | Rubber parts wt. | CPE type | CPE Parts wt. | Impact res.* kJ/m² | Rigidity** N/mm² |
|---|---|---|---|---|---|---|---|
| XIII | 37.5 | 37.5 | 12.5 | B | 12.5 | 57.5 | 1780 |
| XIV | 37.5 | 37.5 | 12.5 | D | 12.5 | 43.9 | 1660 |
| XV | 37.5 | 37.5 | 12.5 | A | 12.5 | 65.0 | 1730 |

For * and **, see Table 2.

EXAMPLES XVI THROUGH XIX AND COMPARATIVE EXAMPLES H., J., K.

Similar to Comparative Examples a through g and Examples II through V, these Examples show the influence of the SAN/PVC ratio on the properties of the polymer composition.

TABLE 6

| Example | SAN parts wt. | PVC parts wt. | Rubber parts wt. | CPE type | CPE Parts wt. | Impact res.* kJ/m² | Rigidity** N/mm² |
|---|---|---|---|---|---|---|---|
| h. | 75 | — | 12.5 | A | 12.5 | 37 | 2130 |
| j. | 56.25 | 18.75 | 12.5 | A | 12.5 | 44.4 | 1900 |
| XVI | 50 | 25 | 12.5 | A | 12.5 | 49.5 | 1890 |
| XVII | 37.5 | 37.5 | 12.5 | A | 12.5 | 65 | 1730 |
| XVIII | 25 | 50 | 12.5 | A | 12.5 | 50.9 | 1580 |
| XIX | 18.75 | 56.25 | 12.5 | A | 12.5 | 54.2 | 1370 |
| k. | — | 75 | 12.5 | A | 12.5 | 43.0 | 1140 |

For * and **, see Table 2.

The Examples XVI to XIX again show that the compositions of the invention show a good Impact-resistance, combined with a retained acceptably high rigidity, whereas in the Comparative Examples especially the impact-resistance is clearly below the level of the compostions of the invention.

EXAMPLES XX and XXI

For the illustrative polymer compositions of Examples I and IX the impact-resistance at −20° C. (by the method of ASTM D256) was also determined. The values were 8.9 and 14.4 kJ/m², respectively.

What is claimed is:

1. A compounded polymer composition composed of:
   a. from 50 to 95 parts by weight of a mixture of
      a.1. from 5 to 70 parts by weight of at least one polymer obtained by copolymerizing a mixture of
         10–90% wt. styrene and/or styrene derivatives,
         90–10% wt. acrylonitrile and/or methacrylonitrile, and
         0–20% wt. of one or more other monomers, and a.2. from 95 to 30% wt. of a vinylchloride polymer; together with b. from 5 to 50 parts by weight of b.1. a substantially saturated rubber, and b.2. chlorinated polyethylene, and wherein the vinylchloride polymer content in the overall polymer composition is at least 25% by weight.

2. Polymer composition according to claim 1, wherein the combined quantity of rubber and chlorinated polyethylene is at least 10%, related to the total polymer composition.

3. Polymer composition of claim 1 or claim 2, wherein the combined quantity of rubber and chlorinated polyethylene is at most 40% by weight.

4. Polymer composition according to any one of claims 1 or 2, wherein said substantially saturated rubber is selected from the group of butyl rubber, chlorobutyl rubber, acrylate rubber, ethylene-propylene rubber, and ethylene-propylene-diene rubber.

5. Polymer composition according to either one of claims 1 or 2, wherein the weight ratio of chlorinated polyethylene to rubber is between 1:20 and 20:1.

6. Polymer composition according to either one of claims 1 or 2, wherein the weight ratio of chlorinated polyethylene and rubber is between 1:4 and 4:1.

7. Polymer composition according to either one of claims 1 or 2, wherein said chlorinated polyethylene has a chlorine content between 15 and 50 wt. %.

8. Polymer composition according to either one of claims 1 or 2, wherein said chlorinated polyethylene has a DSC crystallinity value of between 10% and 40% in the second heating curve.

9. A compounded polymer composition composed of:

10 to 65% wt. of a copolymer of styrene and acrylonitrile,
25 to 85% wt. of polyvinylchloride,
2.5 to 20% wt. of substantially saturated rubber,
2.5 to 20% wt. of chlorinated polyethylene, and
0 to 10% wt. of additives.

10. A compounded polymer composition composed of:

10 to 65% wt. of a copolymer of styrene and acrylonitrile
25 to 80% wt. of polyvinylchloride
5 to 20% wt. of substantially saturated rubber
5 to 20% wt. of chlorinated polyethylene
0 to 10% wt. of additives.

* * * * *